(12) United States Patent
Isenhour et al.

(10) Patent No.: US 10,101,548 B2
(45) Date of Patent: Oct. 16, 2018

(54) OPTICAL CONNECTOR ASSEMBLIES INCORPORATING ELECTRICAL CONTACTS

(71) Applicant: Corning Optical Communications LLC, Hickory, NC (US)

(72) Inventors: Micah Colen Isenhour, Lincolnton, NC (US); Eric Stephan ten Have, Berlin (DE); Michael Wimmer, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/208,916

(22) Filed: Jul. 13, 2016

(65) Prior Publication Data
US 2017/0023752 A1    Jan. 26, 2017

Related U.S. Application Data

(60) Provisional application No. 62/196,601, filed on Jul. 24, 2015.

(51) Int. Cl.
| | |
|---|---|
| G02B 6/36 | (2006.01) |
| G02B 6/42 | (2006.01) |
| G02B 3/00 | (2006.01) |
| G02B 6/38 | (2006.01) |

(52) U.S. Cl.
CPC ......... *G02B 6/4293* (2013.01); *G02B 3/0087* (2013.01); *G02B 6/3817* (2013.01); *G02B 6/3853* (2013.01); *G02B 6/3882* (2013.01); *G02B 6/3885* (2013.01); *G02B 6/3846* (2013.01); *G02B 6/4214* (2013.01)

(58) Field of Classification Search
CPC ...... G02B 6/4214; G02B 6/4292; G02B 6/32; G02B 6/36; G02B 6/428; G02B 3/0087
See application file for complete search history.

(56) References Cited

U.S. PATENT DOCUMENTS

| | | | |
|---|---|---|---|
| 6,513,390 B1 * | 2/2003 | De La Puente ...... | G01B 11/165 73/800 |
| 8,070,532 B1 * | 12/2011 | Sun ...................... | H01R 13/642 439/677 |

(Continued)

FOREIGN PATENT DOCUMENTS

WO    2014086393 A1    6/2014

*Primary Examiner* — Jennifer Doan
(74) *Attorney, Agent, or Firm* — Michael E. Carroll, Jr.

(57) ABSTRACT

Optical connector assemblies for device-to-device optical connections are disclosed. In one embodiment, an optical connector assembly includes a housing having a mating surface, an optical coupling body, a first contact pin, and a second contact pin. The optical coupling body includes an optical coupling face such that the optical coupling face is exposed at the mating surface of the housing. The optical connector assembly further includes a plurality of GRIN lenses disposed within the optical coupling body, wherein each GRIN lens has a coupling surface positioned at the optical coupling face of the optical coupling body. The first and second contact pins extend from the mating surface of the housing such that they are positioned on opposite sides of the optical coupling body. Optical connector assemblies incorporating a total-internal-reflection surface are also disclosed.

15 Claims, 11 Drawing Sheets

(56) References Cited

U.S. PATENT DOCUMENTS

| | | | | |
|---|---|---|---|---|
| 8,616,781 B2* | 12/2013 | Knapp | ................ | G02B 6/32 |
| | | | | 385/19 |
| 2006/0093276 A1* | 5/2006 | Bouma | ............ | A61B 1/00183 |
| | | | | 385/72 |

* cited by examiner

OPTICAL CONNECTOR ASSEMBLIES INCORPORATING ELECTRICAL CONTACTS

PRIORITY APPLICATION

This application claims the benefit of priority under 35 U.S.C. § 119 of U.S. Provisional Application Ser. No. 62/196,601, filed on Jul. 24, 2015, the content of which is relied upon and incorporated herein by reference in its entirety.

BACKGROUND

Field

The present disclosure generally relates to optical connectors and, more particularly, optical connectors employing gradient-index lenses for optical communication as well as electrical contacts for transmitting electrical power and/or signals between coupled electronic devices.

Technical Background

Short-distance data links used for consumer electronics are reaching increasingly higher data rates, especially those used for video and data storage applications. At such high data rates, traditional copper cables have limited transmission distance and cable flexibility. For at least these reasons, optical fiber is emerging as an alternative to copper wire for accommodating the high data rates for the next generations of consumer electronics.

Unlike telecommunication applications that employ expensive, high-power edge-emitting lasers along with modulators, short-distance optical fiber links are based on low-cost, low-power, directly modulated light sources such as vertical-cavity surface-emitting lasers (VCSELs). To be viable for consumer electronics, the fiber optic interface connectors and assemblies used to couple light from the light source into an optical fiber in one direction and light traveling in another optical fiber onto the photodiode in the other direction need to be low-cost. This requirement drives the need for the design of fiber optic connectors to be simple to manufacture while having suitable performance.

Further, electronic devices are increasingly becoming smaller and smaller. This electronic device miniaturization further presents mechanical coupling and optical alignment challenges. Accordingly, there is an unresolved need for low-cost, small optical connectors with forgiving misalignment tolerances and limited moving parts between mated optical interfaces of optical connectors.

SUMMARY

Embodiments of the present disclosure relate to optical connectors for optically coupling electronic devices by use of an optical cable assembly. The optical connectors described herein provide for a connector interface for miniature electronic devices and optical cable assemblies. Generally speaking, a male optical connector for use in an optical cable assembly uses tapered gradient-index ("GRIN") lenses to expand optical signals propagating within optical fibers coupled to the tapered GRIN lenses. A female optical connector for use as a receptacle in an electronic device employs a lens body having a total-internal-reflection ("TIR") surface to direct optical signals between active devices within electronic devices (e.g., laser diodes and photo diodes) and optical fibers within an optical cable assembly. The expanded beam diameter of the optical signals provided by the GRIN lenses allows for large alignment tolerances for the lateral misalignment of a plug optical connector assembly with respect to a mated receptacle optical connector assembly.

According to one embodiment, an optical connector assembly includes a housing having a mating surface, and, disposed within the housing, an optical coupling body, a first contact pin, and a second contact pin. The optical coupling body includes an optical coupling face, wherein the optical coupling face is disposed within the housing such that the optical coupling face is exposed at the mating surface of the housing. The optical connector assembly further includes a plurality of GRIN lenses disposed within the optical coupling body, wherein each GRIN lens of the plurality of GRIN lenses has a coupling surface positioned at the optical coupling face of the optical coupling body. Each GRIN lens has a tapered shape. The first contact pin extends from the mating surface of the housing and adjacent a first side of optical coupling face of the optical coupling body. The second contact pin extends from the mating surface of the housing and adjacent a second side of the optical coupling face of the optical coupling body. The second side is opposite the first side, and the first contact pin and the second contact pin extend beyond the optical coupling face. If desired in other embodiments, the concepts disclosed may be practiced as an optical only male and female optical connectors that do not include electrical contact pins.

According to another embodiment, an optical connector assembly includes a housing having a mating surface and an opening within the mating surface, a substrate coupled to the housing such that the mating surface is transverse to the substrate, and a lens body coupled to the substrate. The lens body includes a coupling surface, a TIR surface, a bottom surface facing the substrate, and a plurality of lenses positioned on the bottom surface. The TIR surface is opposite from the coupling surface and is angled with respect to the coupling surface. The optical connector assembly further includes a first contact clip and a second contact clip, each including an upper arm and a lower arm. The first contact clip and the second contact clip are coupled to the substrate such that the first contact clip is positioned adjacent a first side of the coupling surface of the lens body and the second contact clip is positioned adjacent a second side of the coupling surface of the lens body that is opposite the first side. The first contact clip and the second contact clip define a first contact opening and a second contact opening. The optical connector assembly further includes a plurality of active components coupled to the substrate such that the plurality of active components is aligned with the plurality of lenses.

It is to be understood that both the foregoing general description and the following Detailed Description represent embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various embodiments of the disclosure and together with the description set forth herein serve to explain the principles and operations of the disclosure. The claims are incorporated into and constitute part of the Detailed Description set forth below.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure relate to optical connectors disposed within optical cable assemblies as well as electronic devices. The optical connectors described herein provide for a connector interface for miniature electronic devices and optical cable assemblies. Generally speaking, a male optical connector for use in an optical cable assembly uses gradient-index ("GRIN") lenses to expand optical signals propagating within optical fibers coupled to the GRIN lenses. A female optical connector for use as a receptacle in an electronic device employs a lens body having a total-internal-reflection ("TIR") surface to direct optical signals between active devices within electronic devices (e.g., laser diodes, such as vertical-cavity surface-emitting-diodes ("VCSELs"), for example) and photo diodes) and optical fibers within an optical cable assembly.

The increased effective area of optical signals provided by the GRIN lenses allows for larger alignment tolerances such that precise and expensive mechanical alignment features are not needed to align the optical interfaces between the optical cable assembly and the receptacle within the electronic device.

Particularly, the optical signals that are propagated by the optical fibers within the optical cable assembly are expanded by the GRIN lenses, coupled to a lens body with a receptacle optical connector such as in a device, and reflected by a TIR surface, which focuses the optical signals towards photo receiver devices (e.g., photo diodes) mounted on a substrate beneath the lens body within the electronic device. In the opposite direction, light emitting devices (e.g., VCSELs) emit optical signals that are collimated by lenses of the lens body. The optical signals are then turned by the TIR surface of the receptacle optical connector and reflected toward the optical connector of the optical cable assembly. The GRIN lenses of the optical connector within the optical cable assembly receive the wide optical signals and focus them to the size of the mode-field diameter of the optical fibers of the fiber optic cable.

This design allows for large alignment tolerances for the lateral misalignment of the male optical connector relative to the receptacle optical connector. As described in more detail below, by introducing an additional curvature to the TIR surface of the lens body, the tolerance for angular misalignments may also be increased.

The large alignment tolerances enable the use of simple mechanical alignment pins that provide both optical alignment and electrical power and/or electrical signals between coupled electronic devices. As presented below, embodiments utilize male contact pins adjacent to an optical coupling face of a plug optical connector that mate with female contact clips adjacent a lens body of a receptacle optical connector.

Various embodiments of male and female optical connectors for device-to-device optical connections are described in detail below.

Figure 1:
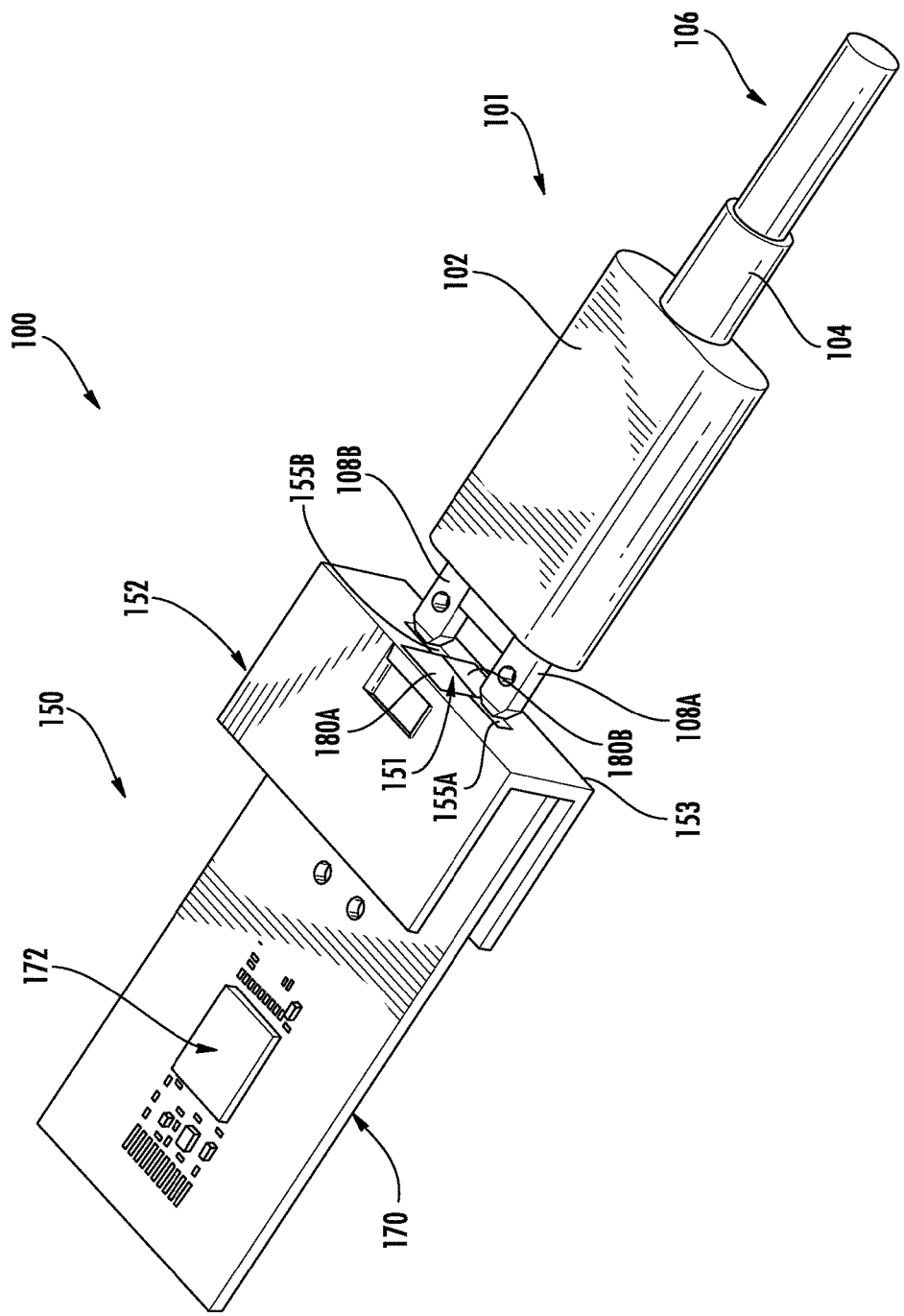
FIG. 1 schematically depicts a perspective view of an optical coupling including a plug optical connector assembly and a receptacle optical coupling assembly according to one or more embodiments described and illustrated herein.

Referring now to FIG. 1, an example optical coupling 100 comprising an example plug optical connector assembly 101 of an optical cable and an example receptacle optical connector assembly 150 is schematically depicted. The receptacle optical connector assembly 150 is configured to be disposed within a housing of an electronic device (not shown), such as, without limitation, a smart phone, a tablet computer, a laptop computer, a desktop computer, and an electronic storage device. The optical cable is utilized to communicatively couple two electronic devices to optically transmit data therebetween.

The plug optical connector assembly 101 will first be described, followed by a description of the receptacle optical connector assembly 150.

Figure 2:
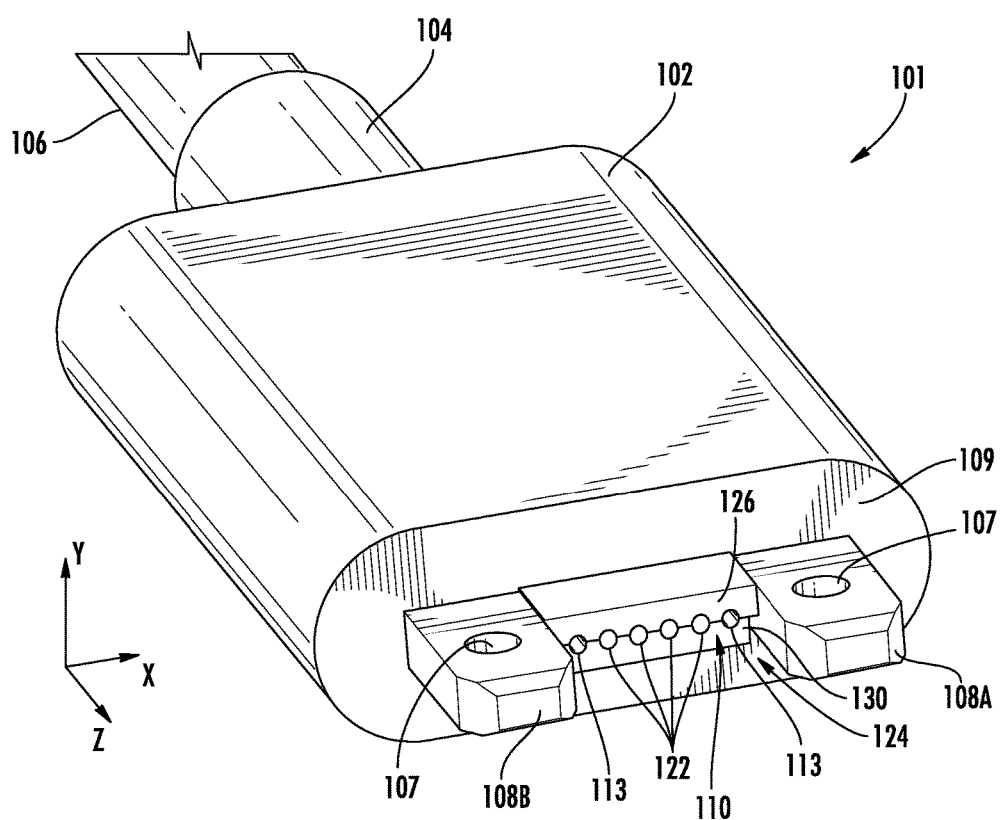
FIG. 2 schematically depicts a front perspective view of the plug optical connector assembly depicted in FIG. 1 according to one or more embodiments described and illustrated herein.
Figure 3:
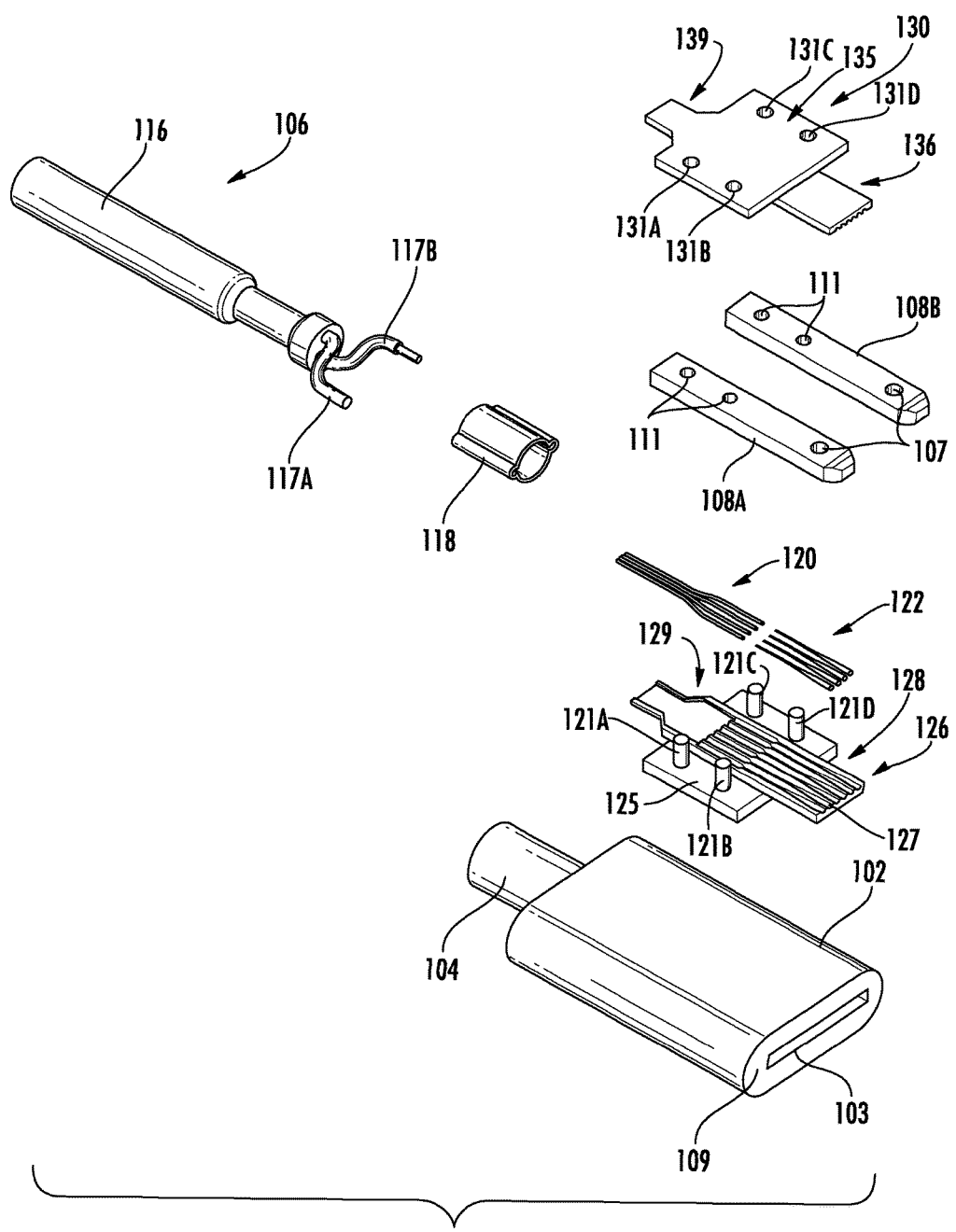
FIG. 3 schematically depicts an exploded perspective view of the plug optical connector assembly depicted in FIGS. 1 and 2 according to one or more embodiments described and illustrated herein.
Figure 4A:
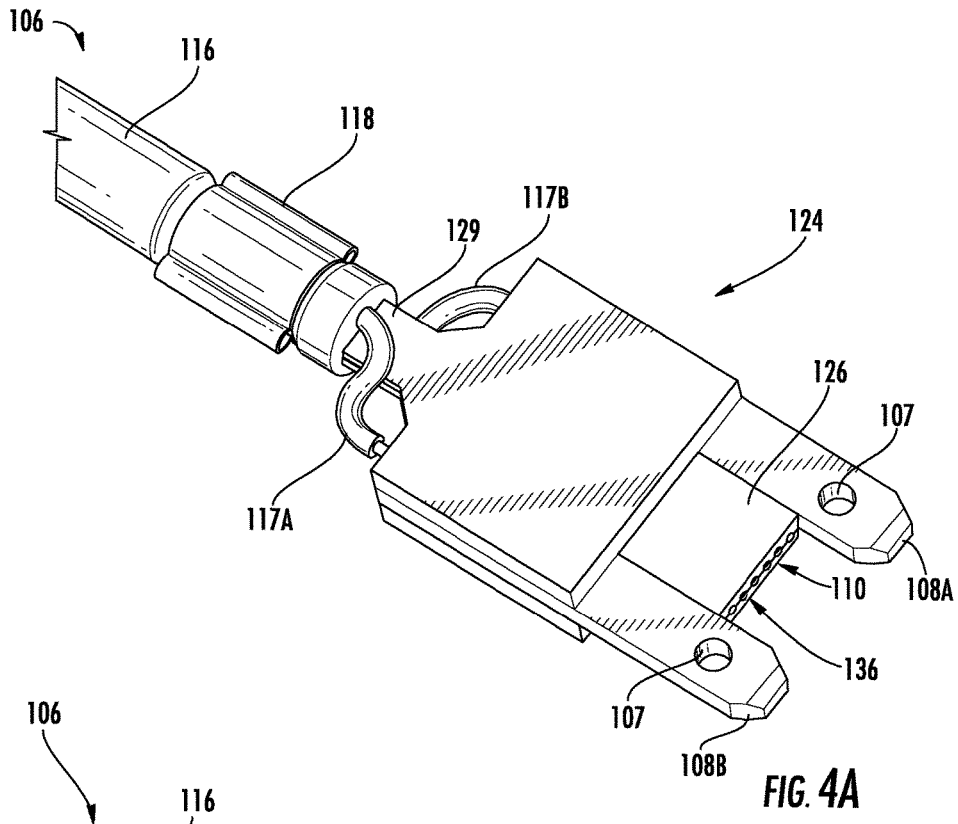
FIG. 4A schematically depicts a perspective view of the plug optical connector assembly depicted in FIGS. 1-3 with a housing removed according to one or more embodiments described and illustrated herein.
Figure 4B:
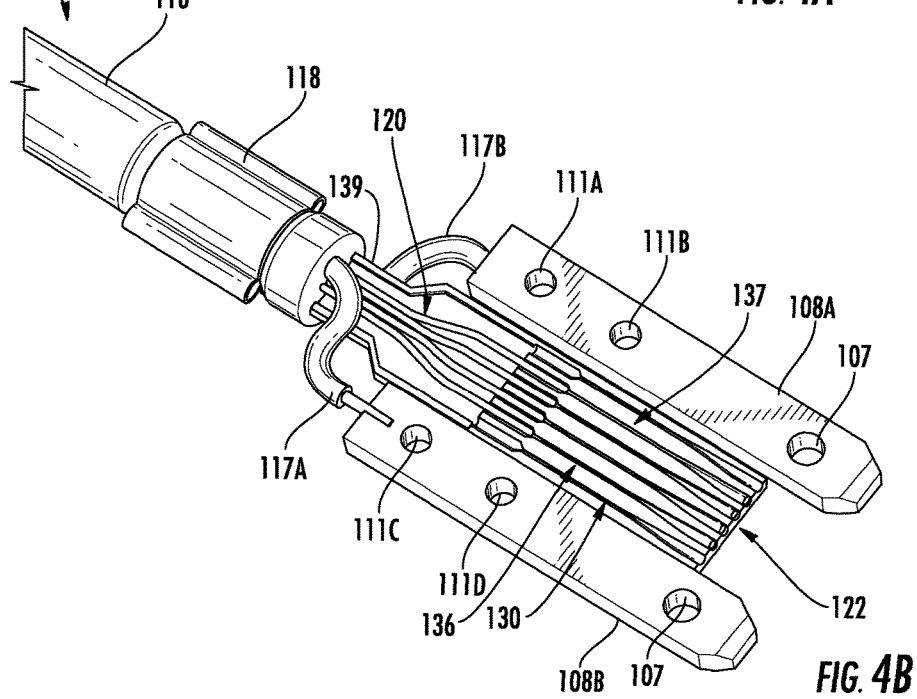
FIG. 4B schematically depicts a perspective view of the plug optical connector assembly depicted in FIGS. 1-3 with a housing and a first body portion removed according to one or more embodiments described and illustrated herein.

Referring generally to FIGS. 2, 3, 4A, and 4B, the example plug optical connector assembly 101 of FIG. 1 is schematically depicted. FIG. 2 is a front perspective view of the plug optical connector assembly 101, FIG. 3 is an exploded perspective view of the plug optical connector assembly 101, FIG. 4A is a perspective view of the plug optical connector assembly 101 without the housing 102, and FIG. 4B is a perspective view of the plug optical connector assembly 101 without the housing 102 and the first body portion 126.

The example plug optical connector assembly 101 generally comprises a housing 102 enclosing an optical coupling body 124, a first contact pin 108A, and a second contact pin 108B. The housing 102 may be, for example, a polymer material that surrounds the interior components. A plurality of GRIN lenses 122 is disposed within the optical coupling body 124 in a plurality of bores 113. The illustrated plug optical connector assembly 101 further comprises an optical cable 106 comprising a plurality of optical fibers 120 and at least two electrically conductive wires 117A, 117B surrounded by an outer jacket 116. If desired, the plug optical connector and receptacle optical connector may omit the electrical contact pins and solely transmit optical signals.

Still further variations of the electrical contact pins are possible. For instance, the electrical contact pins can have other orientations and/or geometries. The embodiment depicted has the contact pins aligned along the x-axis to provide a low-profile for the optical connectors so in can be used in relatively thin devices. In other variations, the first contact pin may be arranged at an angle with respect to the second contact pin such that the pins are arranged so that a length of the first contact pin along a first axis (e.g., x-axis) is longer than a length of the second contact pin along the first axis. As an example and not a limitation the angle between the first contact pin and the second contact pin could be ninety degrees, but other angles such as forty-five or sixty degrees are possible. Likewise, the complimentary first contact opening would be orientated at a similar angle with respect to the second contact opening in the female optical connector (e.g., the receptacle).

As shown in FIG. 2, the first and second contact pins 108A, 108B extend from an opening 103 in a mating surface 109 of the housing 102. A portion of the optical coupling body 124 also extends from the mating surface 109 of the housing 102 such that an optical coupling face 110 of the optical coupling body 124 is offset from the mating surface 109. The first and second contact pins 108A, 108B are adjacent to the optical coupling body 124 and extend beyond plane defined by the optical coupling face 110. The GRIN lenses 122 are disposed within the bores 113 such that a coupling surface of the GRIN lenses 122 is positioned at the optical coupling face 110 of the optical coupling body 124. In the illustrated embodiment, the GRIN lenses 122 have a tapered shape that is tapered from a diameter closely matching the diameter of the optical fiber 120 to a larger diameter at the end face. The tapered shape may enable an optical fiber 120 to be easily coupled to the GRIN lens 122. However, it should be understood that the GRIN lenses 122 may also take on other shapes, such as a cylindrical shape.

Referring generally to FIGS. 1-3, 4A and 4B, the first and second contact pins 108A, 108B are generally planar such that they have a rectangular shape in cross-section (i.e., the first and second contact pins 108A, 108B are longer in the x-axis direction than the y-axis direction). Due to the simple design of the first and second contact pins 108A, 108B, they may be stamped from an electrically conductive material, such as copper-based material, for example, but other suitable conductive materials are possible. The example first and second contact pins 108A, 108B have a tapered end to assist in insertion of the plug optical connector assembly 101 into the receptacle optical connector assembly 150. Each of the example first and second contact pins 108A, 108B further include an engagement feature configured as a pin through hole 107. The pin through holes 107 are operable to contact and engage a corresponding engagement feature 157 of contact clips 158A, 158B of the receptacle optical connector assembly 150 (see FIG. 6), as described in more detail below. In other embodiments, the engagement features on the first and second contact pins 108A, 108B may be configured as a recess rather than a through hole, such as a blind hole (e.g., not a through bore). Other configurations are also possible.

Referring specifically now to FIG. 3, assembly of the plug optical connector assembly 101 will now be described. In the illustrated embodiment, the optical coupling body 124 comprises a first body portion 126 and a second body portion 130. When mated together, the first body portion 126 and the second body portion 130 define the optical coupling body 124.

The first body portion 126 has a first surface having a plurality of first grooves 127 disposed thereon. The plurality of first grooves 127 is shaped to accept the tapered GRIN lenses 122, as well as stripped and unstripped portions of the plurality of optical fibers 120. As used herein, the term "stripped portion" means a portion of an optical fiber wherein one or more coating layers are removed from the optical fiber. As used herein, "unstripped portion" of an optical fiber means a portion of the optical fiber wherein one or more coating layers are present on the optical fiber. Accordingly, the plurality of first grooves 127 may have relatively narrow and relatively wide portions with tapered portions therebetween to accommodate the differently shaped optical fibers and GRIN lenses.

The first body portion 126 has a front portion 128 and a rear portion 129 extending in opposite directions from a central portion 125. The front portion 128 terminates in the optical coupling face 110 (see FIG. 2), and the portions of the first grooves 127 within the front portion 128 accepts the tapered GRIN lenses 122. The portion of the first grooves 127 within the rear portion 129 accepts the optical fibers 120.

Extending from a surface of the central portion 125 are two first posts 121A, 121B adjacent a first edge of the central portion 125, and two second posts 121C, 121D adjacent a second edge of the central portion 125. It should be understood that more or fewer first and second posts may be provided than depicted in FIG. 3. As described in more detail below, the posts 121A-121D are used to couple the first body portion 126 to the first and second contact pins 108A, 108B and the second body portion 130.

Like the first body portion 126, the second body portion 130 also comprises corresponding plurality of second grooves 137 on a second surface shaped to receive the plurality of GRIN lenses 122 and the plurality of optical fibers 120, as best shown in FIG. 4B. Similarly, the second body portion 130 comprises a central portion 135, and a rear portion 139 and a front portion 136 both extending from the central portion 135. An end of the front portion 136 of the second body portion 130, along with the front portion 128 of the first body portion 126, defines the optical coupling face 110 of the optical coupling body 124.

The central portion 135 of the second body portion 130 includes one or more first through holes 131A, 131B proximate a first edge, and one or more second through holes 131C, 131D. The number and placement of first and second through holes 131A-131D correspond with the number and placement of the first and second posts 121A-121D of the first body portion 126. Of course, the structures of the first and second body portions 126,130 may have the structure integrally formed or the structure may be formed as separate components if desired.

The first and second contact pins 108A, 108B each have through holes 111 positioned such that the first posts 121A, 121B and the second posts 121C, 121D may be disposed within the through holes 111 of the first contact pin 108A and the second contact pin 108B, respectively. In other variations, the first and second body portions may be designed with both holes and posts so that a single part may be used for the first and second body portions.

To assemble the illustrated plug optical connector assembly 101, the GRIN lenses 122 and the optical fibers 120 are positioned within the first grooves 127 of the first body portion 126. Ends of the optical fibers 120 are optically coupled to the smaller diameter ends of the GRIN lenses 122. In one embodiment, the GRIN lenses 122 are tapered such that they have a diameter substantially matching the diameter of the stripped portion of the optical fibers 120. By way of example, the small end portion of the GRIN lenses may have a diameter of about 125 microns, but other suitable dimensions are possible. The optical fibers 120 may be spliced to the smaller diameter end of the GRIN lenses 122 to optically couple the optical fibers to the GRIN lenses 122. The optical fibers 120 may also be coupled to the GRIN lenses 122 by fusing such as laser or arc welding, use of an index-matching adhesive, or by any other appropriate method. The optical fibers 120 and the GRIN lenses 122 may be secured within the first grooves 127 by use of an adhesive, for example. The first and second contact pins 108A, 108B are positioned on the first body portion 126 such that the posts 121A-121D are disposed within the through holes 111 of the first and second contact pins 108A, 108B. The second body portion 130 is placed on the first body portion 126 such that the posts 121A-121D of the first body portion 126 are positioned within the through holes 131A-131D of the second body portion 130. The first grooves 127 of the first body portion 126 align with the second grooves 137 of the second body portion 130 to form the bores 113 of the optical coupling body 124 that surround the GRIN lenses 122 and the optical fibers 120.

It should be understood that the optical coupling body may be made of a single component comprising bores into which the plurality of optical fibers 120, the plurality of GRIN lenses 122, and the first and second contact pins 108A, 108B are inserted. In other embodiments, the optical coupling body may have a clam-shell design including a hinge such that the optical coupling body may be closed and sealed upon positioning the plurality of optical fibers 120, the plurality of GRIN lenses 122 and the first and second contact pins 108A, 108B into the opened optical coupling body.

First and second electrically conductive wires 117A, 117B are electrically coupled to the first and second contact pins 108A, 108B (e.g., by soldering). As shown in FIGS. 4A and 4B, the rear portions 129, 139 of the first and second body portion 126, 130 may be pushed into the outer jacket 116 so the rear portions 129,139 are partially inserted into the outer jacket 116 of the fiber optic cable. A crimp member 118 may then be crimped onto the outer jacket 116 to secure the optical fibers 120 and first and second electrically conductive wires 117A, 117B.

Finally, the outer housing 102 is disposed about the assembled optical coupling body 124, the optical fibers 120, and the first and second electrically conductive wires 117A, 117B. For example, the housing 102 may be molded around the assembled optical coupling body 124 after its assembly. In other embodiments, the housing 102 is a two-part component that is positioned about the assembled optical coupling body 124 and then secured together. As shown in FIG. 1, the first and second contact pins 108A, 108B and the optical coupling face 110 of the optical coupling body 124 extends beyond the mating surface 109 of the housing 102. The housing 102 may also include a strain relief portion 104 positioned over the crimp member 118 in some embodiments.

Figure 5:
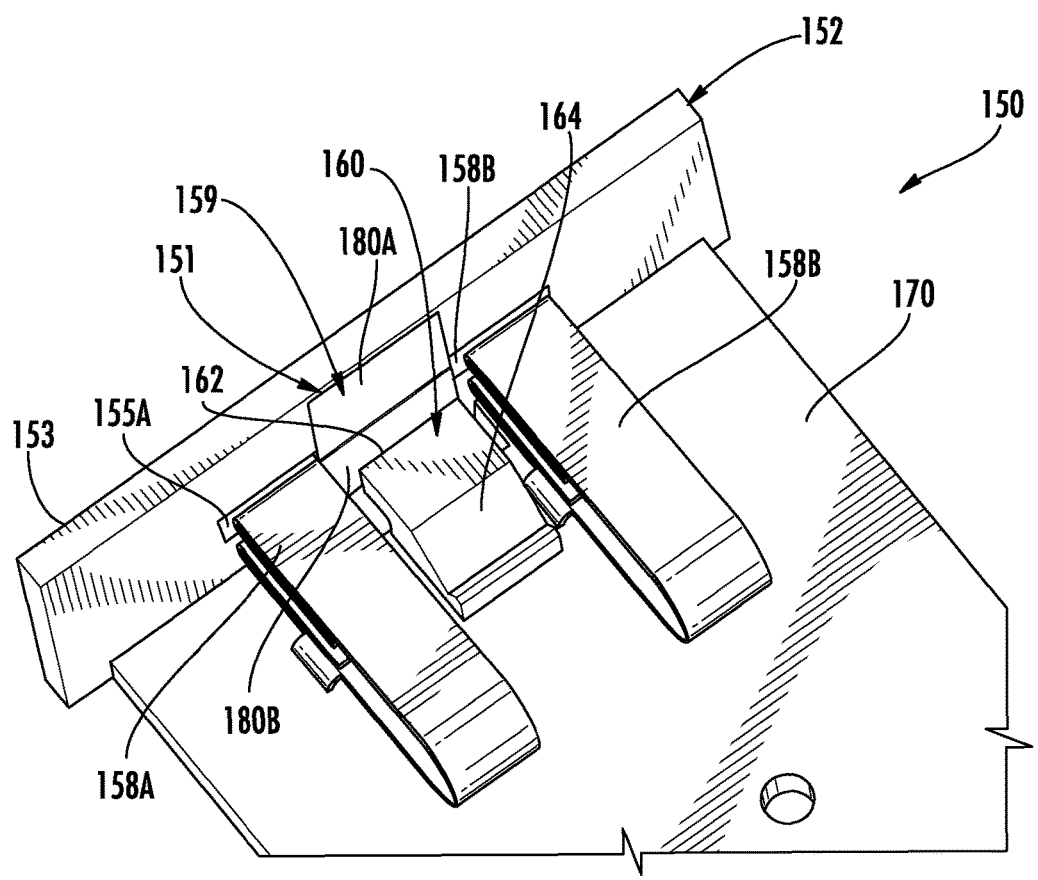
FIG. 5 schematically depicts a rear perspective view of the receptacle optical connector assembly depicted in FIG. 1 according to one or more embodiments described and illustrated herein.

Referring now to FIGS. 1 and 5, an example receptacle optical connector assembly 150 will now be described. The illustrated receptacle optical connector assembly 150 generally comprises a housing 152, a substrate 170 coupled to the housing 152, a lens body 160 coupled to the substrate 170, and first and second contact clips 158A, 158B coupled to the substrate such that they are adjacent to the lens body 160. The substrate 170 may be a printed circuit board fabricated from FR-4, for example. FIG. 1 further illustrates control circuitry 172 on the substrate 170 used to convert optical signals to electrical signals, convert electrical signals to optical signals, and condition signals (e.g., retiming, pre-emphasis, equalization, and the like) for data transmission. Accordingly, the substrate 170 may act as a daughter board within an electronic device that is used for optoelectric and electro-optic conversion of signals for optical transmission of data over the optical fibers 120 of the optical cable. Alternatively, the substrate 170 may be the motherboard of the electronic device.

Figure 6:
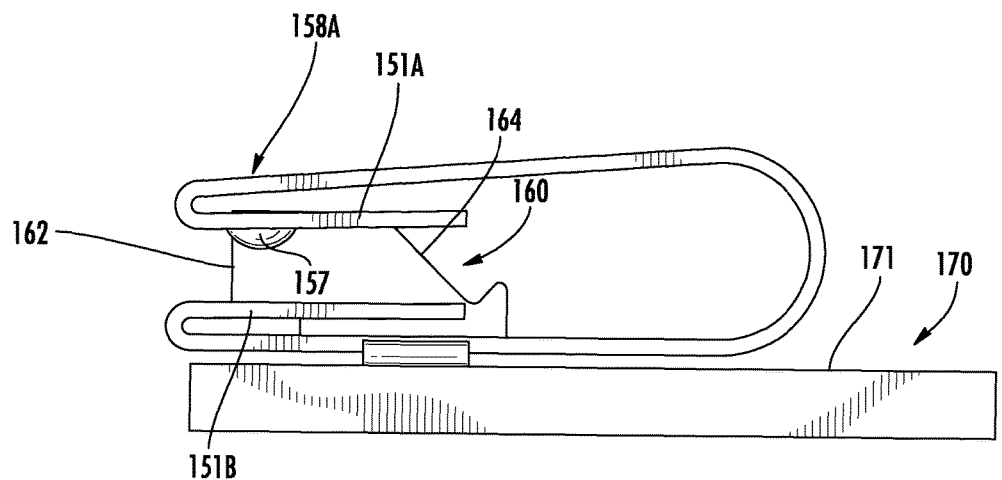
FIG. 6 schematically depicts a side view of the receptacle optical connector assembly depicted in FIGS. 1 and 5 according to one or more embodiments described and illustrated herein.

FIG. 6 is a side view of the example receptacle optical connector assembly 150 depicted in FIGS. 1 and 5. Referring to FIGS. 1, 5 and 6, the housing 152 includes an opening 151 defining an optical interface opening 159 and first and second pin openings 155A, 155B shaped to receive the first and second contact pins 108A, 108B of the plug optical connector assembly 101, respectively.

In the embodiment illustrated in FIGS. 1, 5 and 6, the receptacle optical connector assembly 150 may further include an upper flexible cover 180A and a lower flexible cover 180B disposed in the optical interface opening 159 of the opening 151 within the housing 152. As described in more detail below, the upper and lower flexible covers 180A, 180B protect a coupling surface 162 of the lens body 160 from dust, debris and liquids.

As best shown in FIG. 6, the lens body 160 includes a coupling surface 162 configured for optical signals to pass to and from the plurality of GRIN lenses 122 of a plug optical connector assembly 101. The lens body 160 further includes an angled TIR surface 164 that internally reflects optical signals propagating within the lens body 160 due to the difference in the index of refraction between the material of lens body 160 and that of air.

Figure 7:
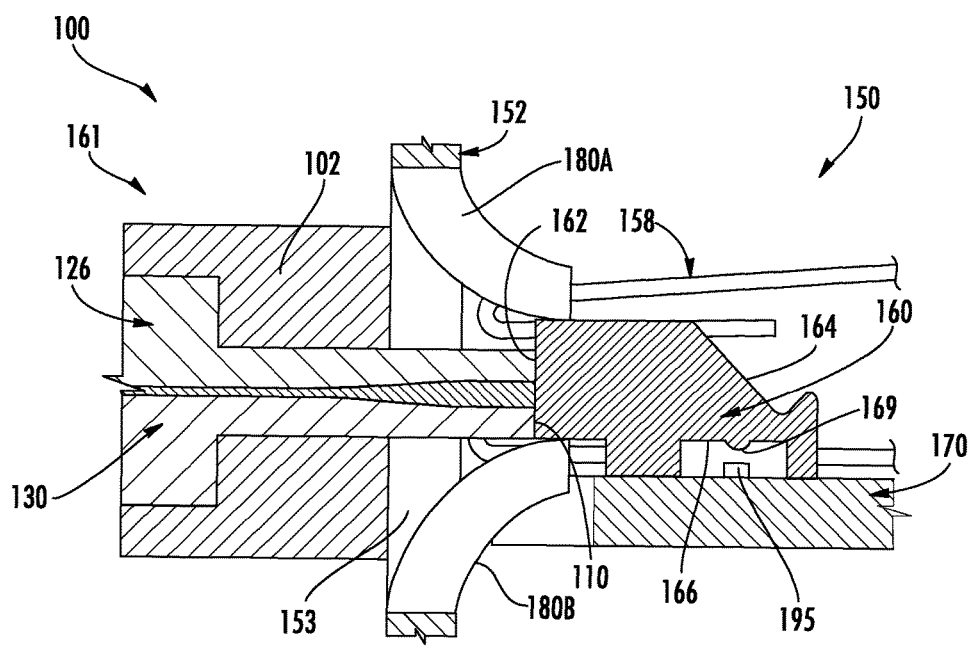
FIG. 7 schematically depicts a cross-sectional view of the receptacle optical connector assembly depicted in FIGS. 1, 5 and 6 mated to the plug optical connector assembly depicted in FIGS. 1-4B according to one or more embodiments described and illustrated herein.
Figure 8A:
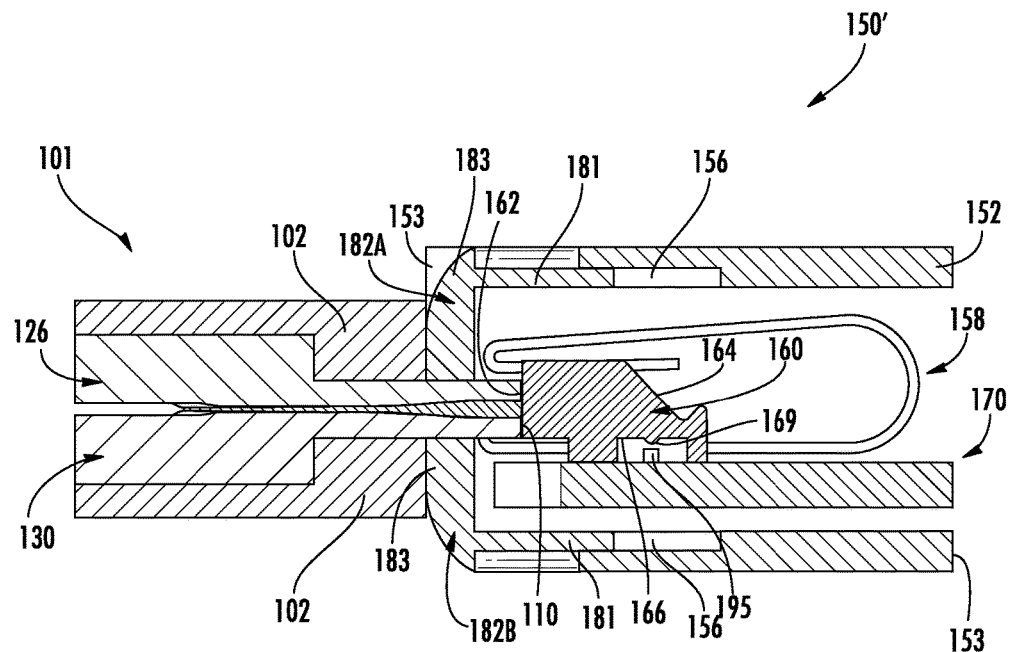
FIG. 8A schematically depicts a cross-sectional view of an alternative receptacle optical connector assembly mated to the plug optical connector assembly depicted in FIGS. 1-4B according to one or more embodiments described and illustrated herein.
Figure 10A:
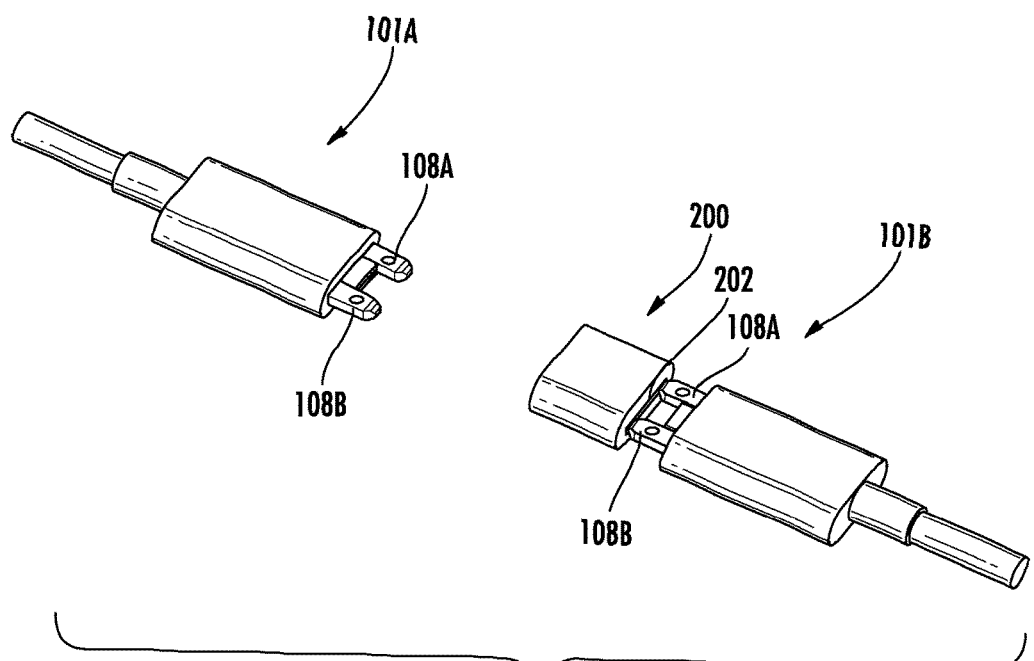
FIG. 10A schematically depicts an optical coupler device, a first plug optical connector assembly and a second plug optical connector assembly in an unmated state according to one or more embodiments described and illustrated herein.

Referring briefly to FIGS. 7, 8A and 10A, which are described in more detail below, the lens body 160 further includes a bottom surface 166. A plurality of lenses 169 are formed on the bottom surface 166 of the lens body 160. The lens body 160 is coupled to the substrate 170 such that the plurality of lenses 169 is substantially aligned with a plurality of active components (i.e., photodetectors and laser diodes). Accordingly, the plurality of lenses 169 is positioned above the plurality of active components in substantial alignment. As described in more detail below, the plurality of lenses 169 focus optical signals redirected from the plurality of optical fibers 120 toward active components 195 (FIG. 10A) configured as a photodetector. The plurality of lenses 169 expand optical signals emitted from active components 195 configured as laser diodes or the like.

The lens body 160 is fabricated from a material that is optically transmissive to the wavelength of the optical signals transmitted to and from the optical fibers. A non-limiting example material for the lens body includes 160 includes polyetherimide. The features of the lens body 160, such as the TIR surface 164 and plurality of lenses 169, for example, may be formed by molding.

Referring to FIGS. 5 and 6, the first and second contact clips 158A, 158B are positioned on adjacent sides of the lens body 160 and are electrically and mechanically coupled to the substrate 170. The first and second contact clips 158A, 158B define openings (aligned with first and second pin openings 155A, 155B in the housing 152) in which to receive the first and second contact pins 108A, 108B, respectively. In the illustrated embodiment, the first and second contact clips 158A, 158B are configured as spring clips fabricated from a single strip of electrically conductive material, such as copper-based material. The first and second contact clips 158A, 158B are bent and curved such that they have an upper arm 151A and a lower arm 151B. The upper arm 151A and lower arm 151B of the first and second contact clips 158A, 158B contact the first and second contact pins 108A, 108B when the plug optical connector assembly 101 is mated with the receptacle optical connector assembly 150. The upper arm 151A may flex upward when a respective contact pin is inserted between the upper arm 151A and the lower arm 151B.

Referring to FIG. 6, the upper arm 151A of the first and second contact clips 158A, 158B includes a protrusion 157 or other engagement feature configured to be seated in a recess, through hole 107 or other feature of the first and second contact pins 108A, 108B. In other embodiments, the protrusion is positioned in the lower arm 151B, or a protrusion is positioned in both the upper arm 151A and the lower arm 151B. The cooperation between the feature (e.g., through hole 107) of the first and second contact pins 108A, 108B and the protrusion 157 of the first and second contact clips 158A, 158B ensures proper positioning of the plug optical connector assembly 101 within the receptacle optical connector assembly 150, and further ensures a secured connection therebetween. Further, the interface between the protrusion 157 and the feature (e.g., through hole 107) provides a defined electrical connection location between the plug optical connector assembly 101 and the receptacle optical connector assembly 150. The positioning of the protrusions 157 of the first and second contact clips 158A, 158B into the features 107 of the first and second contact pins 108A, 108B provide haptic (e.g., positive) feedback to the user that the plug optical connector assembly 101 is properly positioned within the receptacle optical connector assembly 150.

As stated above and shown in FIGS. 1 and 5, the optical interface opening 159 may have an upper flexible cover member 180A and a lower flexible cover member 180B disposed therein. The upper and lower flexible cover members 180A, 180B may protect the coupling surface 162 of the lens body 160 from dust, debris and liquid when the receptacle optical connector assembly 150 is in an unmated state.

Referring to FIG. 7, which shows the receptacle optical connector assembly 150 in a mated state with a plug optical connector assembly 101, the upper flexible cover member 180A and the lower flexible cover member 180B are made from a pliable material such that they flex inward in a direction toward the lens body 160 by force applied by the optical coupling face 110 of the plug optical connector assembly 101, thereby exposing the coupling surface 162 of the lens body 160 for optical coupling between the optical coupling face 110 and the coupling surface 162.

Figure 8B:
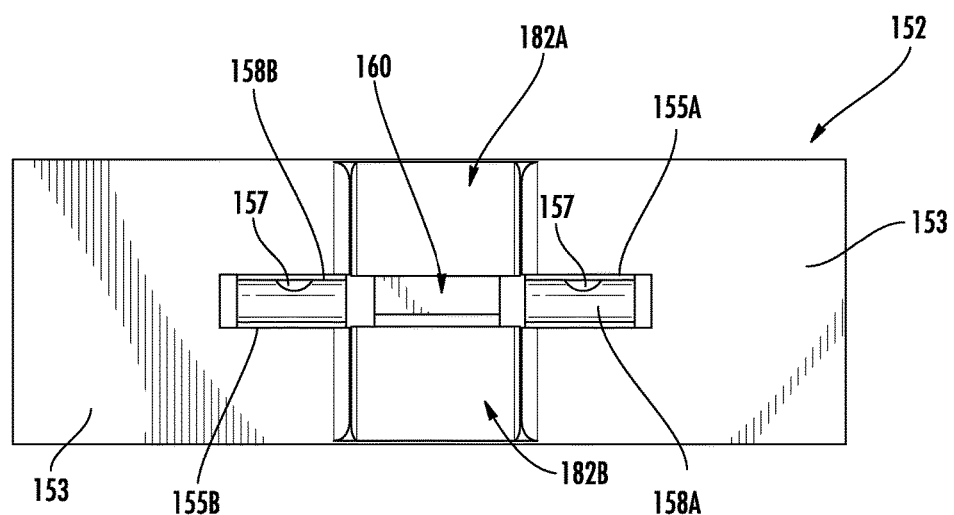
FIG. 8B schematically depicts a front view of the receptacle optical connector assembly depicted in FIG. 8A according to one or more embodiments described and illustrated herein.

In an alternative embodiment, referring to FIGS. 8A and 8B, an upper sliding member 182A and a lower sliding member 182B replace the previously described upper flexible member 180A and lower flexible member 180B. FIG. 8A is a cross-sectional view of a plug optical connector assembly 101 mated with a receptacle optical connector assembly 150' having the upper and lower sliding members 182A, 182B. FIG. 8B is a front view of the receptacle optical connector assembly 150' depicted in FIG. 8A.

The upper and lower sliding members 182A, 182B have a cover portion 183 and a slide portion 181. The cover portion 183 covers substantially the entire optical interface opening 159. A gap is provided between the cover portions 183 of the upper and lower sliding members 182A, 182B to allow the optical coupling body 124 and its optical coupling face 110 to be disposed therethrough to allow optical coupling between the optical coupling face 110 and the coupling surface 162 of the lens body 160. The slide portions 181 are disposed in notches 156 of the housing 152.

Although not shown in FIGS. 8A and 8B, bias members, such as springs, may bias the upper sliding member 182A and the lower sliding member 182B such that the cover portions 183 are at the mating surface 153 of the housing 152, as shown in FIG. 8A. When a user desires to clean the coupling surface 162 of the lens body, he or she pushes the upper and lower sling members 182A, 182B back into the housing 152 to expose the coupling surface 162. The user may then apply a cloth or other cleaning device to clean the coupling surface 162. The user may then allow the upper and lower sliding member 182A, 182B to move back to the unretracted positing when finished cleaning the coupling surface 162.

Figure 9A:
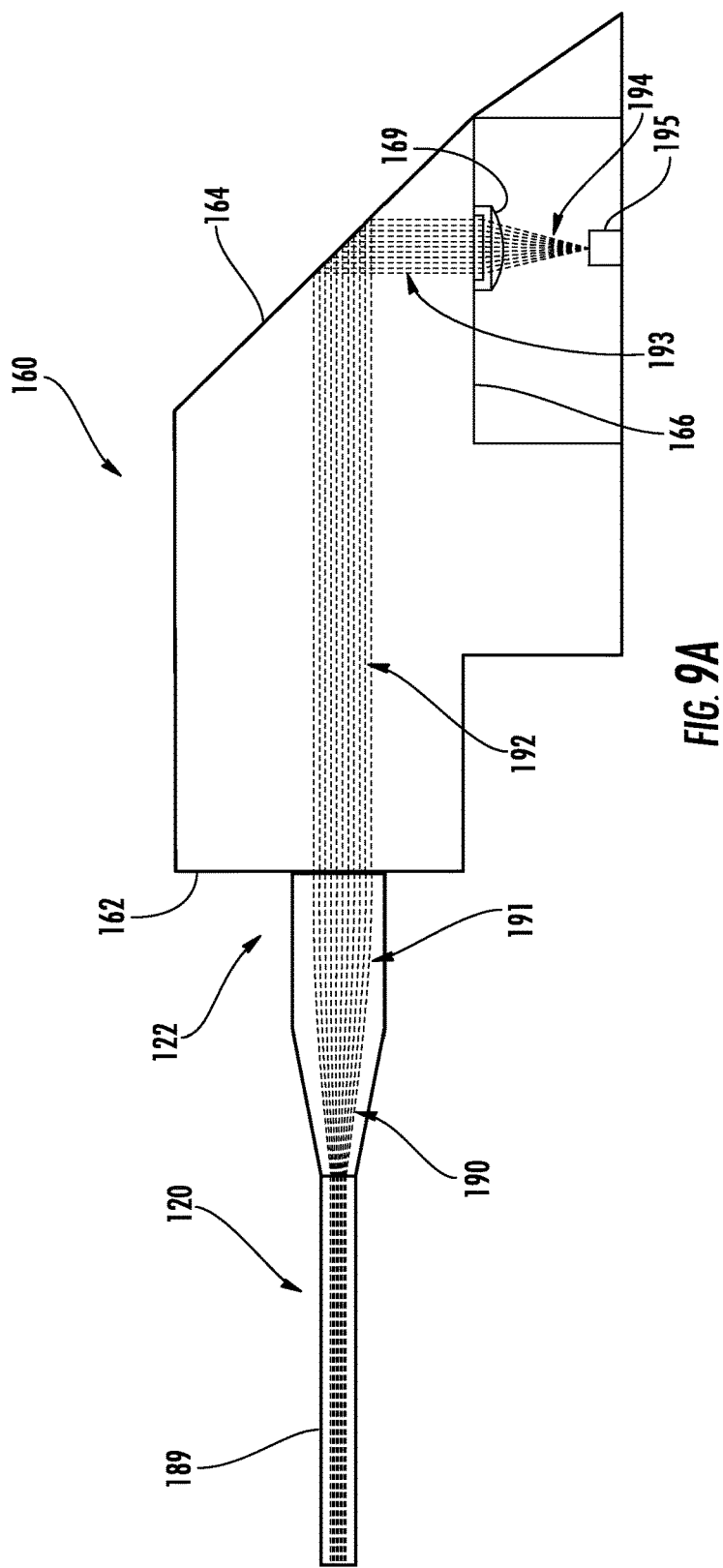
FIG. 9A schematically depicts a side view of an optical signal propagating through an optical fiber, a GRIN lens, and a lens body according to one or more embodiments described and illustrated herein.
Figure 9B:
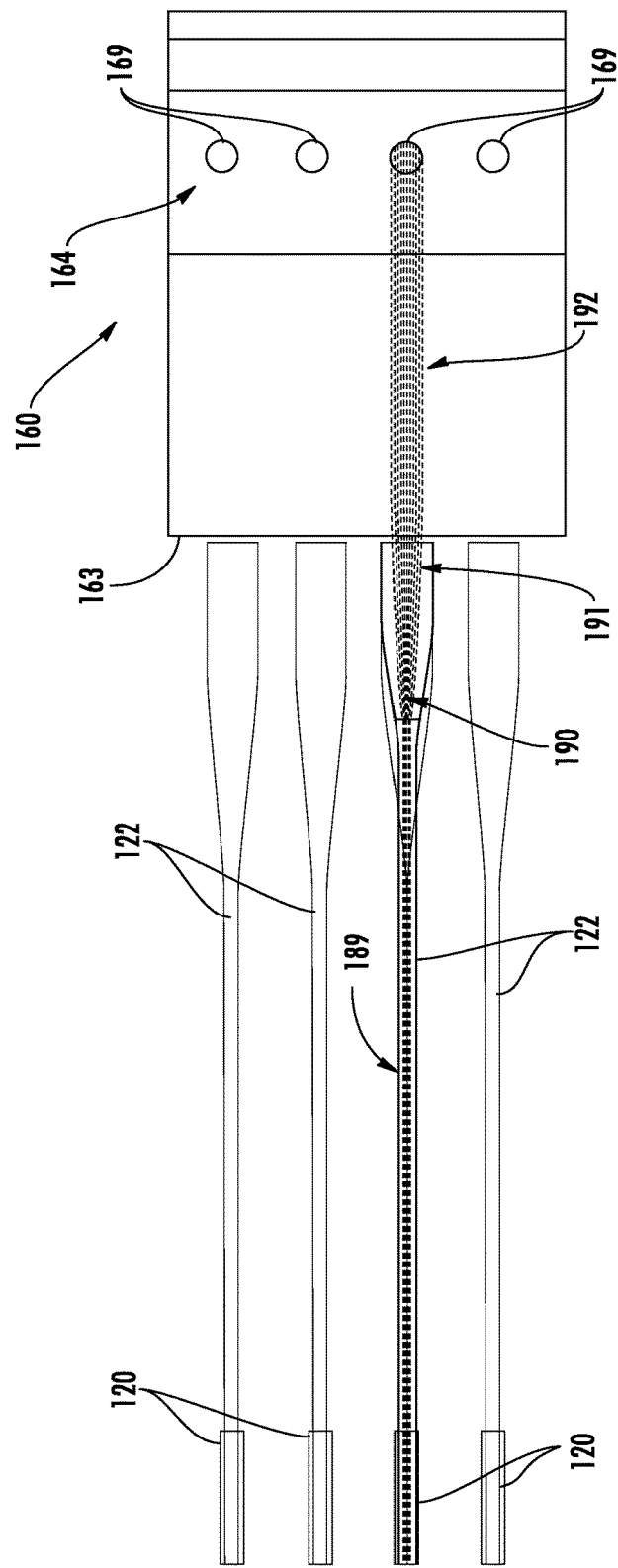
FIG. 9B schematically depicts a top view of an optical signal propagating through an optical fiber, a GRIN lens, and a lens body according to one or more embodiments described and illustrated herein.

FIG. 9A depicts a side view of a schematic representation of optical signals passing between an optical fiber 120, a GRIN lens 122, a lens body 160, and an active component 195. FIG. 9B depicts a top view of a schematic representation of optical signals passing between an optical fiber 120, a GRIN lens 122, a lens body 160 and an active component (not visible in FIG. 9B). Note that FIGS. 9A and 9B are not to scale and are for illustrative purposes only. Referring to both FIGS. 9A and 9B, optical signals 189 propagating in an optical fiber 120 toward the lens body 160 are emitted from the optical fiber 120 and enter the GRIN lens 122. The GRIN lens 122 expands the optical signal to a larger diameter (reference numeral 190). The GRIN lens collimates (or nearly collimates or slightly focuses) the optical signal (reference numeral 191) where it then exits the GRIN lens 122 and then enters the transmissive lens body 160 (reference numeral 192). The optical signal is incident on the TIR surface 164 of the lens body 160, where it is reflected by total-internal-reflection, as depicted by reference numeral 193.

The optical signal is then focused by lens 169 of the lens body 160 (reference numeral 194), where it is received by an active component 195 (i.e., a photodetector, such as a photodiode) and is converted into an electrical signal.

Similarly, where the active component 195 is a laser diode or the like, an optical signal 194 emitted by the laser diode is collimated by the lens 169 (or nearly collimated) as illustrated by reference numeral 193. The optical signal is incident on the TIR surface 164 of the lens body 160 where it is reflected by total-internal-reflection toward the GRIN lens 122 (reference numeral 192). The GRIN lens 122 receives the optical signal 191 and focuses it to a diameter matching that of the mode-field diameter of the optical fiber (reference numeral 190). The optical signal then enters the optical fiber 120 and propagates therein (reference numeral 189).

The expansion of the beam diameter of the optical signals by the GRIN lenses 122 allows for large lateral tolerances of the plug optical connector assembly 101 relative to the lens body 160. Simulations show that almost all of the light of the laser diode may be coupled into a coupled optical fiber (disregarding Fresnel reflections at the interfaces, which may be reduced by anti-reflection coatings). Additionally, in some embodiments, a curved TIR surface 164 (i.e., convex shape) may be provided to increase the tolerance to angular misalignment between the GRIN lenses 122 of the plug optical connector assembly 101 and the lens body 160 of the receptacle optical connector assembly 150.

Figure 10B:
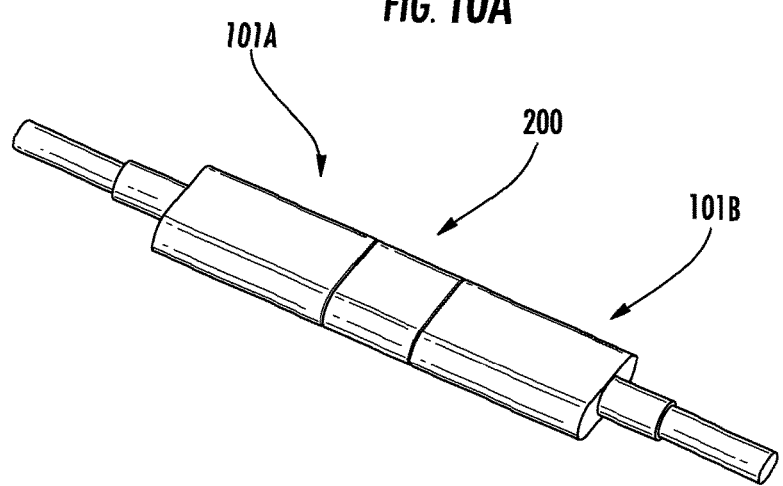
FIG. 10B schematically depicts the first plug optical connector assembly mated to the second plug optical connector assembly by the optical coupler device depicted in FIG. 10A according to one or more embodiments described and illustrated herein.

Referring now to FIGS. 10A and 10B, an example optical coupler device 200 may be utilized to couple a first plug optical connector assembly 101A to a second plug optical connector assembly 101B. The optical coupler device 200 includes an opening 202 of a coupler housing 201 into which the first and second plug optical connector assemblies 101A, 101B are inserted. FIG. 10B depicts the two plug optical connector assemblies optically coupled together by the optical coupler device 200.

Figure 10C:
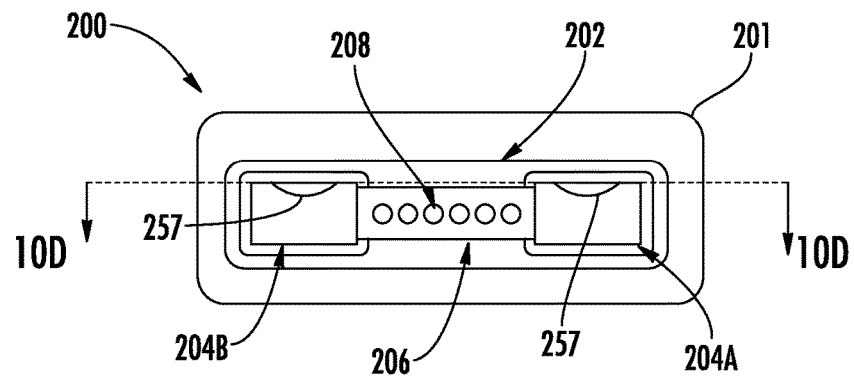
FIG. 10C schematically depicts a front view of the optical coupler device depicted in FIGS. 10A and 10B according to one or more embodiments described and illustrated herein.
Figure 10D:
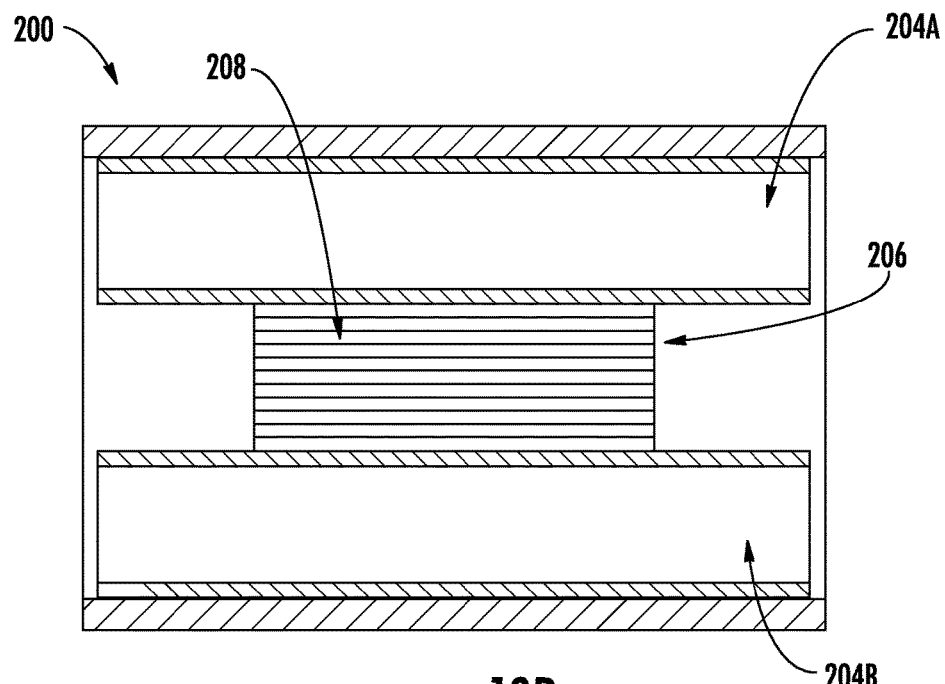
FIG. 10D schematically depicts a cross-sectional view of the optical coupler device taken along line A-A of FIG. 10C according to one or more embodiments described and illustrated herein.

FIG. 10C illustrates a front view of the example optical coupler device 200 depicted in FIGS. 10A and 10B. FIG. 10D illustrates a cross-sectional view taken along line A-A in FIG. 10C. Within the opening 202 are first and second electrical contacts 204A, 204B configured as electrically conductive sleeves that mate with the first and second contact pins 108A, 108B of the first and second plug optical connector assemblies 101A, 101B to pass electrical signals and/or power therebetween. Each first and second electrical contact may include a protrusion 257 or other engagement feature for mating with the pin through holes 107 or recess of the first and second contact pins 108A, 108B. Disposed between the first and second electrical contacts 204A, 204B may be an optical assembly 206 comprising a plurality of waveguides 208, which may be configured as GRIN lenses within bores of a substrate, for example. Any type of waveguide may be utilized. The GRIN lenses 122 of the first and second plug optical connector assemblies 101A, 101B are optically coupled to the waveguides 208 of the optical assembly 206 such that optical signals may pass between the first and second plug optical connector assemblies 101A, 101B via the waveguides 208 within the optical coupler device 200. In other embodiments, no optical assembly 206 is provided. In these embodiments, collimated light passes directly between the GRIN lenses of the first and second plug optical connector assemblies 101A, 101B.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

The invention claimed is:

1. An optical connector assembly comprising:
a housing comprising a mating surface;
an optical coupling body comprising an optical coupling face, wherein the optical coupling body extends from the housing such that the optical coupling face is exposed at the mating surface of the housing;
a plurality of gradient-index (GRIN) lenses disposed within the optical coupling body, wherein each GRIN lens of the plurality of GRIN lenses has a coupling surface positioned at the optical coupling face of the optical coupling body;
a first contact pin extending from the mating surface of the housing and adjacent a first side of optical coupling face of the optical coupling body; and
a second contact pin extending from the mating surface of the housing and adjacent a second side of the optical coupling face of the optical coupling body, wherein the second side is opposite the first side, and the first contact pin and the second contact pin extend beyond the optical coupling face.

2. The optical connector assembly of claim 1, wherein the first contact pin and the second contact pin are substantially planar such that each has a rectangular shape in cross-section.

3. The optical connector assembly of claim 2, wherein the first contact pin is arranged at an angle with respect to the second contact pin such that a length of the first contact pin along a first axis is longer than a length of the second contact pin along the first axis.

4. The optical connector assembly of claim 1, wherein the first contact pin and the second contact pin each comprise a recess at a location beyond the mating surface of the housing.

5. The optical connector assembly of claim 4, wherein the recess is a through hole.

6. The optical connector assembly of claim 1, wherein each GRIN lens of the plurality of GRIN lenses expand and then substantially collimate light in a first direction, and substantially collimate then focus light in a second direction opposite to the first direction.

7. The optical connector assembly of claim 1, wherein the optical coupling face of the optical coupling body is positioned beyond the mating surface of the housing.

8. The optical connector assembly of claim 1, wherein the optical coupling body further comprises:
a first body portion; and
a second body portion coupled to the first body portion, wherein the plurality of GRIN lenses is disposed between the first body portion and the second body portion.

9. The optical connector assembly of claim 8, wherein:
the first body portion comprises:
a first surface;
at least one first post extending from the first surface proximate a first edge of the first body portion; and at least one second post extending from the first surface proximate a second edge of the first body portion;

the second body portion comprises:
  a second surface;
  at least one first through hole proximate a first edge of the second body portion;
  at least one second through hole proximate a second edge of the second body portion;

each of the first contact pin and the second contact pin comprise at least one pin through hole; and the at least one first post is disposed within the at least one through hole of the first contact pin and the at least one first through hole of the second body portion, and the at least one second post is disposed within the at least one through hole of the second contact pin and the at least one second through hole of the second body portion such that the first contact pin and the second contact pin are disposed between the first body portion and the second body portion.

10. The optical connector assembly of claim 8, wherein:
the first body portion comprises a first surface and a plurality of first grooves within the first surface;
the second body portion comprises a second surface and a plurality of second grooves within the second surface;
the first surface of the first body portion contacts the second surface of the second body portion such that the plurality of first grooves and the plurality of second grooves form a plurality of bores disposed through the optical coupling body;
the optical connector assembly further comprises a plurality of optical fibers; and
the plurality of optical fibers and the plurality of GRIN lenses are disposed within the plurality of bores such that the plurality of optical fibers is optically coupled to the plurality of GRIN lenses.

11. The optical connector assembly of claim 1, wherein each GRIN lens has a tapered shape.

12. The optical connector assembly of claim 11, wherein the plurality of optical fibers is spliced to the plurality of GRIN lenses.

13. The optical connector assembly of claim 11, wherein a diameter of each GRIN lens of the plurality of GRIN lenses increases in a direction toward the coupling surface.

14. The optical connector assembly of claim 1, further comprising:
  a plurality of optical fibers disposed within the optical coupling body and optically coupled to the plurality of GRIN lenses;
  a first electrically conductive wire electrically coupled to the first contact pin; and
  a second electrically conductive wire electrically coupled to the second contact pin.

15. The optical connector assembly of claim 1, further comprising an optical coupler device comprising:
  a coupler housing comprising an opening extending through the coupler housing;
  an optical assembly comprising a first end, a second end, and a plurality of waveguides extending from the first end to the second end, wherein the optical assembly is disposed within the opening of the coupler housing;
  a first electrical contact positioned adjacent a first side of the optical assembly within the opening of the coupler housing, the first electrical contact having a first end and a second end;
  a second electrical contact positioned adjacent a second side of the optical assembly within the opening of the coupler housing, the second electrical contact having a first end and a second end, wherein:
    the optical assembly is positioned within the opening of the coupler housing such that the plurality of GRIN lenses of the optical coupling body align with the plurality of waveguides at either the first end or the second end of the optical assembly; and
    the first electrical contact and the second electrical contact are positioned within the opening of the coupler housing such that the first contact pin and the second contact pin contact the first electrical contact and the second electrical contact, respectively, at either the first end or the second end of the first and second electrical contact.

* * * * *